(12) United States Patent
Bons et al.

(10) Patent No.: US 6,475,548 B2
(45) Date of Patent: Nov. 5, 2002

(54) PREPARATION OF A BLEND OF TRIGLYCERIDES

(75) Inventors: Johannes Robert Bons, Vlaardingen (NL); Eckhard Floeter, Vlaardingen (NL); Cornelis Sjouke Stellema, Vlaardingen (NL)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/880,200

(22) Filed: Jun. 13, 2001

(65) Prior Publication Data

US 2002/0018841 A1 Feb. 14, 2002

(30) Foreign Application Priority Data

Jun. 15, 2000 (EP) ............................................. 00202068

(51) Int. Cl.[7] .................................................. A23D 7/04
(52) U.S. Cl. ....................... 426/603; 426/606; 426/607; 554/211
(58) Field of Search ................................ 426/601, 607, 426/608, 603; 554/211

(56) References Cited

U.S. PATENT DOCUMENTS

| | | | | |
|---|---|---|---|---|
| 2,972,541 A | * | 2/1961 | Cochran et al. | ............ 426/313 |
| 4,360,536 A | * | 11/1982 | Keuning et al. | ............ 426/603 |
| 4,438,149 A | * | 3/1984 | Verhagen et al. | ............ 426/586 |
| 4,594,194 A | * | 6/1986 | Dieffenbacher | ............ 554/211 |
| 4,795,569 A | * | 1/1989 | Higuchi et al. | ............ 210/770 |
| 5,045,243 A | * | 9/1991 | Kuwabara et al. | ............ 554/211 |
| 5,874,599 A | * | 2/1999 | Harris et al. | ................ 554/211 |

FOREIGN PATENT DOCUMENTS

| | | | |
|---|---|---|---|
| EP | 0041300 | * | 5/1981 |
| EP | 0399597 | * | 5/1990 |
| EP | 0651046 | * | 5/1995 |
| EP | 0798369 | * | 3/1997 |
| WO | 95/20313 | | 8/1995 |
| WO | WO 95/26391 | * | 10/1995 |
| WO | WO 96/05279 | * | 2/1996 |
| WO | 96/39804 | | 12/1996 |
| WO | 97/35987 | | 10/1997 |
| WO | WO 98/35001 | * | 8/1998 |
| WO | 00/74470 | | 12/2000 |
| WO | WO 00/74470 | * | 12/2000 |
| WO | WO 01/96507 | * | 5/2001 |

OTHER PUBLICATIONS

European Search Report dated Nov. 21, 2000.
Perez–Vich et al., "Genetic relationships between loci controlling the high stearic and high oleic traits in sunflower", Crop Science, vol. 40, No. 4, pp. 990–995.
Marquez–Ruiz et al., "Thermoxidative stability of triacylglycerols from mutant sunflower seeds", Journal of the American Oil Chemists Society, vol. 76, No. 10, 1999, pp. 1169–1174.

* cited by examiner

Primary Examiner—Carolyn Paden
(74) Attorney, Agent, or Firm—Milton L. Honig

(57) ABSTRACT

Triglyceride fat comprising a stearin fraction of a high stearic, high oleic sunflower oil and a margarine fat phase comprising said stearin in admixture with a liquid vegetable oil in a weight ratio of 20:80 to 80:20.

12 Claims, No Drawings

PREPARATION OF A BLEND OF TRIGLYCERIDES

BACKGROUND OF THE INVENTION

The present invention refers to a process for the preparation of a blend of triglycerides and to food products containing such blends.

Vegetable oils are the major constituents for the manufacture of margarine and similar fat continuous emulsion spreads. However, natural vegetable oils either do not have the triglyceride composition for imparting a proper plastic consistency to the final product or the obtained spreads show various product defects and/or nutritional drawbacks. Additional processing is necessary for a vegetable fat to become a suitable fat phase for spread manufacture. Usually a relative large amount of unprocessed liquid oil is blended with a relatively small amount of fat which is selected because of its liquid oil structuring ability. Such fat usually is a solid fat which has been subjected to one or more processing treatments. Current developments in food production aim at reducing artificial treatments of food in general and of fat in particular. Particularly, chemical processing such as hydrogenation is expected to be largely abandoned.

When developing new margarine fats one of the aims is to find and grow plants which produce fat which after harvesting and purification is suited for margarine manufacture without additional fat processing. Present margarine fats have a high nutritional value because of a high unsaturated fatty acids acid content, but lack the relatively high stearic acid content and particularly the SUS triglycerides which are needed for structuring the liquid part of the fat blend. On the other side too much stearic acid has to be avoided for nutritional reasons. Breeding novel sunflower plants is a promising route for obtaining improved oils.

Some successes have been reported already with obtaining oils which not only have a high content of oleic acid but also an increased stearic acid content, the so called HSHOSF oils. WO 95/20313 discloses mutants seeds of sunflower plants from which a HSHOSF oil can be harvested with a stearic acid content amounting up to 54 wt. %.

The oleic acid content amounts up to 85 wt. % and the linoleic acid content of up to 2 wt. % is desirably low.

The oils can qualify as natural because being obtained not by genetical modification but by classical breeding techniques. They have been developed in an attempt to obtain a margarine fat which does not need further processing. They would enable the manufacture of a margarine prepared with only natural fat. In principle the high amount (>20 wt. %) of native SOS triglycerides in those novel oils of WO 95/20313 promise good structuring of the margarine fat blend. Such oils were expected to perform as margarine fat without the usual addition of a separate hardstock fat. The high monounsaturates (oleic acid) content is advantageous for nutritional value and for oxidation stability.

However, margarine produced with those fats have shown serious product defects because of the fat's poor crystallization kinetics and an unacceptably high margarine hardness at refrigerator temperature.

Moreover the amount of saturated fatty acids in the final product exceeds the level which is still acceptable for a fat which can meet standards for healthy nutrition.

According to WO 95/20313 the novel oils may be used in a margarine fat composition after dilution with a common liquid oil. Such liquid oils generally contain >90 wt. % of U3+SU2 triglycerides (U: unsaturated fatty acid with 18 or more C-atoms, S: saturated fatty acids with 16 or more C-atoms). Although by dilution said product defects become less pronounced, they do not disappear and the level of saturated fatty acids in the products is still too high. Dilution increasingly reduces the amount of structuring triglycerides to such low level that no proper structuring of the fat phase is possible.

WO 97/35987 discloses another high stearic sunflower seed oil containing 30–65 wt. % of stearic acid. However, this oil has a high palmitic acid content of at least 15 wt. % of palmitic acid. This means that it will be considered as a controversial tropical oil because in a number of countries it is believed to be not acceptable for food production. Additionally, for controlling blood cholesterol level stearic acid is clearly preferred above palmitic acid. For the first hardly an effect on cardiovascular health has been found, while the latter is related to adverse health effects.

The sunflower seed oil disclosed in WO 96/39804 also contains a high amount of palmitic acid and therefore has the same disadvantages as the oils disclosed in WO 97/35987.

The present invention is based on the finding that generally with HSHOSF oils, exemplified by the fat of WO 95/20313, nevertheless a high quality margarine fat can be prepared provided that not the whole HSHOSF fat is used but only its stearin fraction which subsequently is blended with a common cheap vegetable oil.

In comparison with a reference spread product made with the untreated oil of WO 95/20313, the margarine obtained according to the invention exhibits fine product properties, such as good spreadability at temperatures close to refrigerator temperature, excellent melting behaviour in the mouth and stability against oil exudation at high ambient temperatures. The performance of the fat blend equals the performance of known high quality fat compositions, but which often comprise a non-natural component such as hydrogenated fat.

For producing the margarine fat blend of the present invention no chemical means are used, so it may be qualified as a natural margarine fat.

Since long stearin fractions of fats are known to be used as part of a fat phase in order to solve other problems with spread manufacture. Good spreads (melanges) could be prepared with a fat phase consisting of at least 70% of natural butter fat and the remainder vegetable oil. In U.S. Pat. No. 4,438,149 the problem was addressed that when spreads were prepared with a fat phase containing less than 70% butter fat the product possessed a too soft consistency at room temperature. It was found that when the stearin-fraction of the butter fat was used, less expensive butter fat was needed for melange production while the spreadability of the product was improved.

SUMMARY OF THE INVENTION

The present invention comprises the preparation of a triglyceride fat suited for structuring a liquid vegetable oil, characterized in that a high stearic high oleic sunflower oil (HSHOSF), such oil containing at least 12 wt. % of stearic acid residues and at least 40 wt. % of oleic acid residues, is subjected to either a wet fractionation or a dry fractionation and a stearin fraction is collected.

The stearin fraction of the fat blend can be obtained by exposing the starting HSHOSF oil to standard conditions for fractionation, either wet or dry fractionation. The fraction containing >30 wt.% of SUS and <40 wt. % of SUU triglycerides is collected.

Suitably, fractionation is stopped when the first 25 wt. % of solid fat has crystallised.

DETAILED DESCRIPTION OF THE INVENTION

Wet fractionation uses a solvent selected from the group consisting of acetone, hexane or petroleum ether. A solvent to oil ratio of 4–6 1 solvent per kg oil is applied. For crystallization the oil is cooled to 0–5° C.

Dry fractionation, which is the preferred mode, proceeds according to the following steps:
1. heating the HSHOSF to at least 65° C.,
2. cooling the liquefied oil at a speed of approximately 1° C./minute under continuous agitation to 35° C.;
3. further cooling at an increased rate of approximately 1.5° C/minute to 20° C.,
4. slow cooling to and stabilization at 5–20° C., in particular at 15° C.

The stearin is separated from the resulting slurry in a filter press applying a pressure of about 20 bar. Typically the amount of produced stearin shall be not higher than twice the amount of SUS triglycerides present in the original oil. Typically from an oil containing 20 wt. % of SUS triglycerides not more than 40 wt. % of stearin should be separated. Usually the stearin consists of 50 wt. % of solid material and 50 wt. % of liquid olein captured in the solid crystals. Preferably, the solids content of the stearin is more than 50 wt. %.

Stearin fractions preferably contain <40 wt. % of SUU triglycerides and >30 wt. % of SUS, more preferably >40 wt. % of SUS.

The invention further comprises the preparation of a fat phase which comprises blending the obtained stearin fraction with a liquid vegetable oil which contains >90wt. % of U3+SU2 where the stearin/oil blending ratio ranges from 20:80 to 80:20 weight parts.

The blend as such is suited for use as a margarine fat, but other triglyceride fats could be admixed to the mentioned components in amounts up to 10 wt. %, e.g. 2 wt. % of palm oil.

Most preferred fat blends comprise 18–40 wt. % of SUS and up to 40 wt. % of SUU triglycerides.

If not indicated otherwise in the present specification S denotes a saturated fatty acid with at least 16 C-atoms. U denotes unsaturated fatty acids containing at least 18 C-atoms such as linoleic acid, linolenic acid, arachidonic acid etc., but preferably is oleic acid. Preferably, at least 80 wt. % of U is oleic acid.

The liquid oil component is selected from the group consisting of sunflower oil, high oleic sunflower oil, cotton seed oil, corn oil, olive oil, rapeseed oil, linola oil, flaxseed oil and mixtures of these.

Fat phase blends which are particularly advantageous for application in margarine manufacture display N-values (solid fat contents) in the ranges: N35=0–5; N20=5–25 and N10<45.

N-values are established by NMR-pulse measurements according to Fette, Seifen, Anstrichmittel 80 (1987), 180–186. The fat has not been stabilised, i.e. the fat is melted at about 80° C., kept on this temperature for 30 min, cooled to 0C and kept for 30 min at that temperature and then warmed up to the measurement temperature. The fat is kept at the measurement temperature for 30 min, whereupon the N-value is measured.

The blends of the present invention can be used in various fat containing food products. In products preferably at least 20 wt. % of the fat phase consists of the blend of the present invention. Preferred food products are margarines and similar W/O-emulsion spreads with a fat content of 10–85 wt. %. For the manufacture of margarines and spreads common ingredients, processes and equipment can be used which are well known by the person skilled in the art and which can be found in textbooks like K.A. Alexandersen, Margarine Processing Plants and Equipment (Vol.4, Bailey's Industrial Oil and Fat Products, Wiley and Sons Inc., New York 1996).

Use of the invented fat blends as the fat phase of a margarine or a spread is a further embodiment of our invention.

EXAMPLES

Example 1

Fractionation of a High Stearic High Oleic Sunflower Oil

The oil to be fractionated has the following fatty acid composition

|  | wt. % |
|---|---|
| C16:0 | 6.5 |
| C18:0 | 22 |
| C20:0 | 2.0 |
| C22:0 | 2.5 |
| C18:1 | 62 |
| C18:2 | 5 |

Silver phase chromatography shows the triglycerides composition:

| SUS | 19.5 wt. % of which SOS | 18.2 wt. % |
|---|---|---|
| SUU | 60.4 wt. % of which SOO | 53.2 wt. % |
| UUU | 20.1 wt. % | |

(S: C15+ saturated fatty acids, U: C18+ unsaturated fatty acids, O: oleic acid).

Fractionation results in collecting a stearin fraction which comprises 25% of the highest melting fats of the blend.

1.25 kg of the starting oil was heated until fully liquefied. While stirring at 30 rpm/min the oil was cooled down to 30° C. over a period of about one hour. At an increased rate of approximately 1.5° C./min the oil was cooled to an intermediate temperature of 20° C. Then the oil was slowly cooled to a final 15° C. During crystallisation of the fat the solid phase content (SPC) of the slurry was measured regularly. The fractionation process was concluded when the SPC was approximately equal to the amount of SUS triglycerides in the feedstock. The resulting slurry was subsequently pressed with a filter press applying pressures of up to 20 bar. This pressure is reached at a rate of 2 bar/min pressure increase. The obtained stearin fraction amounts to 25 wt. % of the starting material. The separation efficiency was approximately 0.6 (60% of solid material in the stearin fraction).

According to AgLC this stearin fraction contained the triglycerides

| SUS | 60.2 wt. % of which SOS | 57.8 wt. % |
|---|---|---|
| SUU | 29.2 wt. % of which SOO | 26.4 wt. % |
| UUU | 9.6 wt. % | |

Example 2

Margarine Fat Blend

A common sunflower oil was selected having the following fatty acid profile (wt. %).

| | |
|---|---|
| Palmitic acid | 7% |
| Stearic acid | 5% |
| Oleic acid | 30% |
| Linoleic acid | 58% |

The oil remains fully liquid when cooled down to 7° C. (typical refrigerator temperature).

1 weight part of the stearin resulting from the fractionation of example 1 was mixed with 3 weight parts of this sunflower oil.

The fat blend contains:

| | |
|---|---|
| SUS | 20.1 wt. % |
| SUU | 22.3 wt. % |
| UUU | 57.7 wt. % |

Table I shows the N-values (solid fat contents) for the invented fat blend as well as for the original unprocessed high stearic high oleic sunflower oil.

TABLE I

| Temperature of fat/oil ° C. | Fatblend according to the invention % solids * | Unprocessed high stearic high oleic sunflower oil % solids * |
|---|---|---|
| 5 | 23.5 | 58.0 |
| 10 | 20.4 | 46.1 |
| 15 | 18.1 | 28.3 |
| 20 | 14.4 | 7.3 |
| 25 | 10.0 | 0.3 |
| 30 | 2.9 | 0 |
| 35 | 0.3 | 0 |
| Saturated fatty acid level % | 24.4 | 33.0 |

* measured by means of pulse NMR with standard procedures: stabilization at 0° C. for 16 hours.

These solid fat figures explain why the fat blend according to the invention has appeared to be very suited for manufacturing a margarine or a spread. Especially with regard to stability aspects at ambient temperatures of 20° C. and higher. Additionally at the refrigerator temperature of 5° C. the solid fat content is much less than the 58 wt. % of the original oil which is beneficial for the spreadability of the product. The present invention not only affords a stable margarine, when compared to the reference material the product also has significantly reduced levels of saturated fatty acids.

Example 3

Margarine Manufacture

Using standard labscale equipment (scraped surface heat exchangers (A-units) and pin stirrers (C-units)) and starting from the fat phases of Table I two 80 wt. % fat spreads were produced.

A premix (T=60° C.) was prepared containing the fat phase, a common aqueous phase and a food grade emulsifier (0.3% of distilled unsaturated monoglycerides).

For processing the premix an A-A-C-A-C sequence was used.

Volumes: A-units 18.3 ml; first C-unit 150 ml; second C-unit 75 ml. Throughput 2.5 kg/hour. Rotational shaft speed of all A-units: 600 rpm, of the C-unit: 250 rpm. Outlet temperatures of the scraped surface heat exchangers: approximately 6° C.

The products when filled into tubs were initially stored at the filling temperature of 12° C. and then at the temperatures indicated below.

Over a period of several weeks the appearance and the structure of the products were monitored.

For hardness assessment a Stevens texture profile analyzer was used. Surface cylindrical probehead 4.4 square mm. Penetration speed: 1 mm/sec; penetration depth: 10 mm.

Stevens values were measured after one week of storage at the indicated temperature (Table II).

TABLE II

| T (° C.) | Spread based on fatblend according to the invention Stevens 4.4 in g | Spread based on unprocessed high stearic high oleic sunflower oil Stevens 4.4 in g |
|---|---|---|
| 5 | 95 | 3056 |
| 10 | 62 | 980 |
| 20 | 34 | 24 |

Use of the fat blend according to the invention resulted in acceptable hardness values for the whole temperature range, while the reference product was too hard at low temperatures and tended to be too soft at ambient temperatures.

For a temperature cycling test, both products were exposed to a temperature of 25° C. for 24 hours. After the test the hardness differences became even more apparent.

The product according to the invention withstood the high ambient temperature and fully recovered when placed again at the original refrigerator temperature. To the contrary the reference product at 25° C. suffered from severe oil exudation and was near to collapsing.

Example 4

The present invention was applied on a different HSHOSF oil which according to silverphase chromatography had the triglyceride composition according to Table III (S: a C16+ saturated fatty acid, L: linoleic acid, O: oleic acid)

TABLE III

| Triglyceride class | wt. % |
|---|---|
| SOS | 15.9 |
| SLS | 0.5 |
| SOO | 49.3 |
| SLO/SOL/OSL | 7.0 |
| OOO | 21.3 |
| Rest | 6.0 |

The dry fractionation process was performed as described in example 1. Yield 25.5 wt. % of a stearin fraction with the characteristics as given in Table IV.

Separation efficiency: 0.55.

TABLE IV

| Triglyceride class | WT. % |
| --- | --- |
| SOS | 44 |
| SLS | 3 |
| SUU | 38.57 |
| UUU | 14.5 |

After admixture of the stearin fraction with common sunflower oil in a 1 to 2 ratio a fat blend was obtained. Again a high quality tub margarine could be produced which is apparent from Table V which shows the solid fat contents of said fat phase.

TABLE V

| T (° C.) | Fatblend according to the invention wt. % solids |
| --- | --- |
| 5 | 25.7 |
| 10 | 23.1 |
| 15 | 19.4 |
| 20 | 13.8 |
| 25 | 10.7 |
| 30 | 3.1 |
| 35 | 0.3 |

What is claimed is:

1. A process for the preparation of a triglyceride fat suited for structuring a liquid vegetable oil,
    comprising subjecting a high stearic high oleic sunflower oil (HSHOSF), containing at least 12 wt. % of stearic acid residues and at least 40 wt. % of oleic acid residues, to either a wet fractionation or a dry fractionation treatment and then collecting a stearin fraction.

2. A process according to claim 1, wherein the fractionation is a wet fractionation using a solvent selected from the group consisting of acetone, hexane, petroleum ether and using a solvent to oil ratio of 4–6 l solvent per kg oil while the fractionation is performed at 0°–5° C.

3. A process according to claim 1, wherein the fractionation is performed as a dry fractionation comprising first cooling a liquified high stearic high oleic oil to a temperature in the range 20–35° C. and then cooling to a stabilisation temperature in the range 5–20° C.

4. A process according to claim 1 wherein the stearin fraction comprises <40 wt. % of SUU triglycerides and >30 wt. % of SUS wherein S is a saturated fatty acid with 16 or more C-atoms and U is an unsaturated fatty acid with 18 or more C-atoms.

5. A process according to claim 1 wherein the stearin fraction comprises <40 wt. % of SUU triglycerides and >40 wt. % of SUS.

6. A process for the preparation of a fat phase which comprises blending the stearin fraction according to claim 1 with a liquid vegetable oil which contains >90 wt. % of U3+SU2 and where the stearin/oil blending ratio ranges from 20:80 to 80:20 weight parts.

7. A process according to claim 6, wherein the fat phase comprises 18–40 wt. % of SUS and up to 40 wt. % of SUU triglycerides.

8. A process according to claim 6, wherein at least 80 wt. % of U is oleic acid.

9. A process according to claim 6, wherein the N-values (solid fat contents) of the fat phase blend are: N35=0–5; N20=5–25 and N10<45, values measured by NMR-pulse on a non-stabilised fat at the indicated temperature.

10. A food product comprising a fat phase of which at least 20 wt % consists of the fat phase as mentioned in claim 6.

11. A food product according to claim 10 wherein the food product is a margarine or a spread with a fat content of 10–85 wt. %.

12. The fat blend according to claim 6 as the fat phase of a margarine or a spread.

* * * * *